(12) United States Patent
Kwon et al.

(10) Patent No.: US 9,859,237 B2
(45) Date of Patent: Jan. 2, 2018

(54) CHIP USING TRIPLE PAD CONFIGURATION AND PACKAGING METHOD THEREOF

(71) Applicant: SAMSUNG ELECTRONICS CO., LTD., Suwon-si, Gyeonggi-do (KR)

(72) Inventors: Heungkyu Kwon, Seongnam-si (KR); Inhyuk Kim, Hanam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/843,326

(22) Filed: Sep. 2, 2015

(65) Prior Publication Data

US 2016/0133585 A1    May 12, 2016

(30) Foreign Application Priority Data

Nov. 10, 2014    (KR) .................. 10-2014-0155555

(51) Int. Cl.
| | | |
|---|---|---|
| H01L 23/00 | (2006.01) | |
| H01L 21/66 | (2006.01) | |
| G06F 21/30 | (2013.01) | |
| H01L 21/56 | (2006.01) | |

(Continued)

(52) U.S. Cl.
CPC .............. *H01L 24/05* (2013.01); *G06F 21/30* (2013.01); *H01L 22/32* (2013.01); *H01L 24/03* (2013.01); *H01L 24/11* (2013.01); *H01L 24/19* (2013.01); *H01L 24/20* (2013.01); *H01L 24/85* (2013.01); *H01L 21/561* (2013.01); *H01L 21/568* (2013.01); *H01L 23/3128* (2013.01); *H01L 25/0657* (2013.01); *H01L 2224/0231* (2013.01); *H01L 2224/0237* (2013.01); *H01L 2224/0392* (2013.01); *H01L 2224/0401* (2013.01); *H01L 2224/04042* (2013.01); *H01L 2224/04105* (2013.01); *H01L 2224/05024* (2013.01); *H01L 2224/06515* (2013.01);

(Continued)

(58) Field of Classification Search
None
See application file for complete search history.

(56) References Cited

U.S. PATENT DOCUMENTS

| | | | |
|---|---|---|---|
| 5,554,940 A | 9/1996 | Hubacher | |
| 6,844,631 B2 * | 1/2005 | Yong ................. | H01L 22/32 257/48 |

(Continued)

FOREIGN PATENT DOCUMENTS

| | | |
|---|---|---|
| JP | 2004-296464 | 10/2004 |
| KR | 1019970023929 | 5/1997 |
| KR | 1020050011082 | 1/2005 |

*Primary Examiner* — Andres Munoz
(74) *Attorney, Agent, or Firm* — F. Chau & Associates, LLC

(57) ABSTRACT

A chip includes a core layer, at least one redistribution layer formed on the core layer, and at least one triple pad connected to a pad of the core layer through the at least one redistribution layer or at least one via connected to the at least one redistribution layer. The at least one triple pad includes a bonding pad, a redistribution layer pad connected to the at least one redistribution layer, and a test pad configured to perform a wafer level test. The bonding pad, the redistribution layer pad and the test pad are connected to one another through the at least one redistribution layer, and the test pad is disposed in a core area that overlaps the core layer.

25 Claims, 15 Drawing Sheets

(51) Int. Cl.
*H01L 23/31* (2006.01)
*H01L 25/065* (2006.01)

(52) U.S. Cl.
CPC ......... *H01L 2224/12105* (2013.01); *H01L 2224/16227* (2013.01); *H01L 2224/32145* (2013.01); *H01L 2224/32225* (2013.01); *H01L 2224/48091* (2013.01); *H01L 2224/48227* (2013.01); *H01L 2224/48247* (2013.01); *H01L 2224/73253* (2013.01); *H01L 2224/73265* (2013.01); *H01L 2225/0651* (2013.01); *H01L 2225/06517* (2013.01); *H01L 2225/06558* (2013.01); *H01L 2225/06568* (2013.01); *H01L 2225/1023* (2013.01); *H01L 2225/1035* (2013.01); *H01L 2225/1041* (2013.01); *H01L 2225/1058* (2013.01); *H01L 2924/00014* (2013.01); *H01L 2924/15311* (2013.01); *H01L 2924/181* (2013.01); *H01L 2924/18162* (2013.01)

(56) References Cited

U.S. PATENT DOCUMENTS

| | | |
|---|---|---|
| 6,937,047 B2 | 8/2005 | Tran et al. |
| 7,061,785 B2 | 6/2006 | Miwa et al. |
| 7,394,161 B2 * | 7/2008 | Kuo .................. H01L 22/32 257/780 |
| 8,048,761 B2 | 11/2011 | Yeo et al. |
| 8,053,909 B2 | 11/2011 | Hembree |
| 8,335,921 B2 | 12/2012 | Von Behren et al. |
| 8,384,185 B2 | 2/2013 | Ito et al. |
| 8,400,779 B2 | 3/2013 | Kim et al. |
| 8,680,524 B2 | 3/2014 | Oh |
| 8,753,901 B2 * | 6/2014 | Werner .................. H01L 22/32 257/48 |
| 8,847,378 B2 | 9/2014 | Choi et al. |
| 8,927,987 B2 | 1/2015 | Kondou |
| 2002/0180026 A1 * | 12/2002 | Liu .................. H01L 25/0657 257/690 |
| 2005/0173801 A1 * | 8/2005 | Mimura .................. H01L 22/32 257/758 |
| 2007/0170575 A1 * | 7/2007 | Lee .................. H01L 23/66 257/686 |
| 2009/0108453 A1 * | 4/2009 | Lin .................. H01L 23/53238 257/758 |
| 2010/0148349 A1 | 6/2010 | Kim et al. |
| 2013/0147063 A1 | 6/2013 | Park et al. |
| 2013/0299596 A1 | 11/2013 | Choi et al. |
| 2015/0263005 A1 * | 9/2015 | Zhao .................. H01L 25/065 257/777 |

* cited by examiner

CHIP USING TRIPLE PAD CONFIGURATION AND PACKAGING METHOD THEREOF

CROSS-REFERENCE TO RELATED APPLICATIONS

This application claims priority under 35 U.S.C. §119 to Korean Patent Application No. 10-2014-0155555 filed on Nov. 10, 2014, the disclosure of which is incorporated by reference herein in its entirety.

TECHNICAL FIELD

Exemplary embodiments of the inventive concept described herein relate to a chip using a triple pad configuration and a packaging method thereof.

DISCUSSION OF THE RELATED ART

To increase the integration density of semiconductor devices used in electronic devices, a plurality of semiconductor chips may be stacked upon one another in a semiconductor device. However, when semiconductor chips are stacked in a semiconductor device to increase the integration density, the operation speed of the semiconductor device may be reduced due to an increase in the distance between the chips.

SUMMARY

Exemplary embodiments of the inventive concept provide a chip having a reduced size and a packaging method thereof.

According to an exemplary embodiment of the inventive concept, a chip includes a core layer, at least one redistribution layer formed on the core layer, and at least one triple pad connected to a pad of the core layer through the at least one redistribution layer or at least one via connected to the at least one redistribution layer. The at least one triple pad includes a bonding pad, a redistribution layer pad connected to the at least one redistribution layer, and a test pad configured to perform a wafer level test. The bonding pad, the redistribution layer pad and the test pad are connected to one another through the at least one redistribution layer, and the test pad is disposed in a core area that overlaps the core layer.

In an exemplary embodiment, the bonding pad is disposed in the core area.

In an exemplary embodiment, the test pad is configured to perform a probing test.

In an exemplary embodiment, the bonding pad is a bump pad.

In an exemplary embodiment, the bonding pad is disposed in a core outside area that does not overlap the core layer.

In an exemplary embodiment, the redistribution layer pad is disposed in the core area.

In an exemplary embodiment, the bonding pad is configured to perform wire bonding.

In an exemplary embodiment, the redistribution layer pad is disposed between the bonding pad and the test pad.

In an exemplary embodiment, the test pad is disposed between the bonding pad and the redistribution layer pad.

In an exemplary embodiment, the pad of the core layer is an input and output pad.

According to an exemplary embodiment of the inventive concept, a method of packaging a wafer level chip includes disposing a core layer on a substrate, forming a mold substrate on the core layer, removing the substrate, forming an insulating layer on the core layer and the mold substrate, forming at least one contact hole in the insulating layer that exposes at least one pad of the core layer, and forming at least one redistribution layer connected to the at least one pad. Forming the at least one redistribution layer includes forming at least one triple pad. The at least one triple pad includes a bonding pad, a redistribution layer pad, and a test pad connected to one another through the at least one redistribution layer. The test pad is disposed in a core area that overlaps the core layer.

In an exemplary embodiment, the method further includes performing a wafer level test using the test pad.

In an exemplary embodiment, the method further includes forming a mask film having at least one contact hole.

In an exemplary embodiment, the method further includes forming at least one solder ball in the at least one contact hole of the mask film.

In an exemplary embodiment, the bonding pad is disposed in the core area.

In an exemplary embodiment, the bonding pad is disposed outside of the core area.

In an exemplary embodiment, the method further includes performing a wire bonding process using the bonding pad.

According to an exemplary embodiment of the inventive concept, a package chip includes a near field communication (NFC) controller configured to provide an NFC service, and an embedded secure element disposed on the NFC controller and configured to store authentication information. The NFC controller and the embedded secure element are packaged using at least one triple pad or at least one dual pad. The at least one triple pad includes a first bonding pad, a first redistribution layer pad, and a first test pad connected to at least one first redistribution layer. The at least one dual pad includes a second redistribution layer pad and a second test pad connected to at least one second redistribution layer. Each of the first and second test pads is disposed in a core area that overlaps a core layer.

In an exemplary embodiment, an interposer disposed between the NFC controller and the embedded secure element.

In an exemplary embodiment, the at least one triple pad is connected to an input and output pad of the core layer.

In an exemplary embodiment, the at least one triple pad is connected to a power pad or a ground pad of the core layer.

In an exemplary embodiment, the package chip is packaged using one of a wafer level package (WLP), a fan-out wafer level package (FOWLP), a wire bonding-fine pitch ball grid array (WB-FBGA) package, a flip chip-FBGA (FC-FBGA) package, a WB/WB package, a WB/FC-FBGA package, a WB/WB system in package (SIP) package, a WB/FC SIP package, a fan-out wafer level package (FOWLP) SIP package, and a FOWLP package on package (POP).

According to an exemplary embodiment of the inventive concept, a chip includes a core layer, at least one redistribution layer formed on the core layer, and at least one dual pad connected to a pad of the core layer through the at least one redistribution layer or at least one via connected to the at least one redistribution layer. The at least one dual pad includes a redistribution layer pad and a test pad connected to the at least one redistribution layer, and the redistribution layer pad and the test pad are disposed in a core area that overlaps the core layer.

In an exemplary embodiment, the pad of the core layer is a power pad or a ground pad.

In an exemplary embodiment, the test pad is configured to perform a probing test.

BRIEF DESCRIPTION OF THE DRAWINGS

The above and other features of the present inventive concept will become apparent by describing in detail exemplary embodiments thereof with reference to the accompanying drawings, in which.

DETAILED DESCRIPTION OF THE EXEMPLARY EMBODIMENTS

Figure 1:
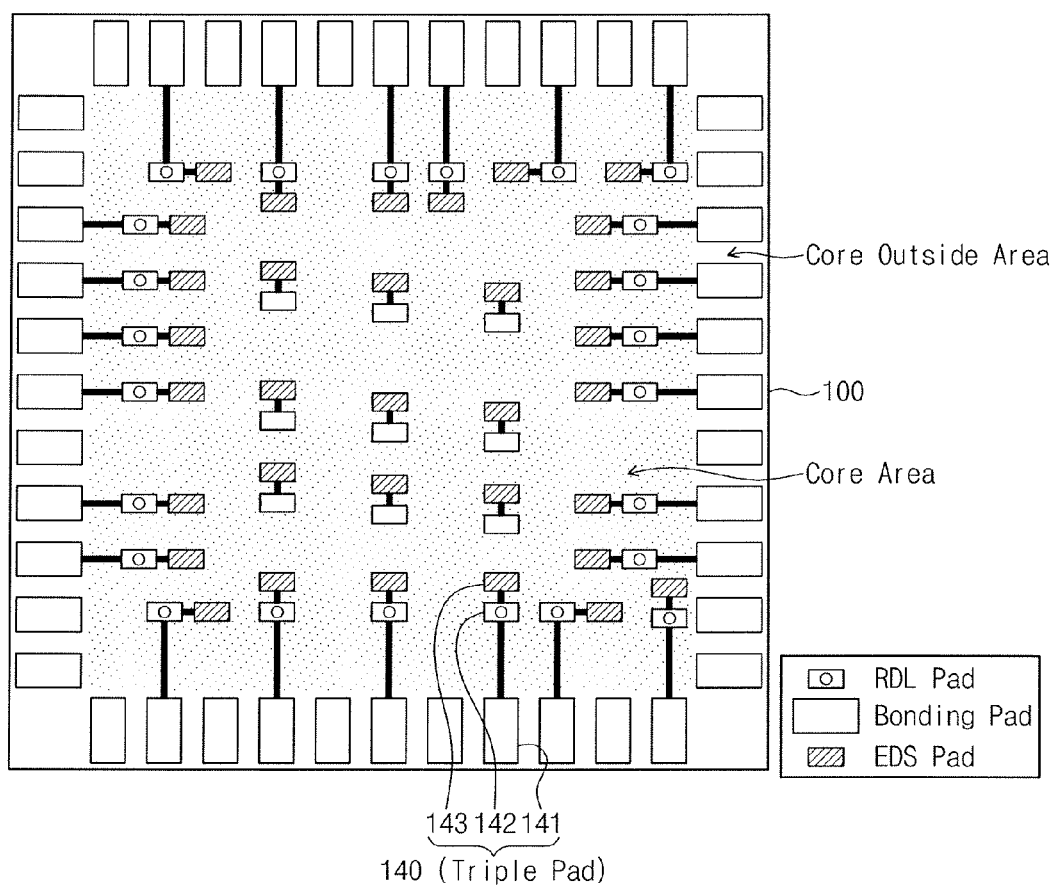
FIG. 1 is a plan view of an exemplary chip having a triple pad configuration according to an exemplary embodiment of the inventive concept.

Exemplary embodiments of the present inventive concept will be described more fully hereinafter with reference to the accompanying drawings. In the drawings, the sizes and relative sizes of layers and regions may be exaggerated for clarity. Like reference numerals may refer to like elements throughout the accompanying drawings.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (e.g., rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

As used herein, the singular forms "a", "an" and "the" are intended to include the plural forms as well, unless the context clearly indicates otherwise.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a plan view of an exemplary chip having a triple pad configuration according to an exemplary embodiment of the inventive concept.

Referring to FIG. 1, the triple pad 140 may include a bonding pad 141, a redistribution layer (RDL) pad 142, and a test pad 143. The test pad 143 may be referred to herein as an electrical die sorting (EDS) pad 143. Herein, the bonding pad 141, the RDL pad 142, and the EDS pad 143 may be electrically connected to each other through at least one redistribution layer (RDL) 130. The bonding pad 141 may be, for example, a bump pad.

The bonding pad 141 is a pad that may be used in a packaging stage. The bonding pad 141 may exist in a core outside area. The core outside area may refer to an area outside of an area overlapped with an core layer (110). Here, an internal circuit may be implemented in the core layer (110). The bonding pad 141 may be utilized to bond the chip using, for example, wire bonding (e.g., the bonding pad 141 may be a pad which has the dedicated function of being utilized for bonding the chip to other elements via, for example, wire bonding). The test pad 143 may be utilized to perform a test operation such as, for example, a wafer level test and/or a probing test (e.g., the test pad 143 may be a pad which has the dedicated function of being used to perform a test operation(s)).

In an exemplary embodiment of the inventive concept, the chip 100 may be implemented by a fan-out packaging structure. In an exemplary embodiment of the inventive concept, the bonding pad 141 may be a pad used for performing wire bonding. Meanwhile, a location of a bonding pad 141 of FIG. 1 may not limit the scope and spirit of the inventive concept. The boding pad 141 according to an exemplary embodiment of the inventive concept may be implemented on at least one of a core area or an outside area.

In an exemplary embodiment of the inventive concept, the bonding pad 141 may be electrically connected to the RDL pad 142 using redistribution layers (RDLs).

Figure 2:
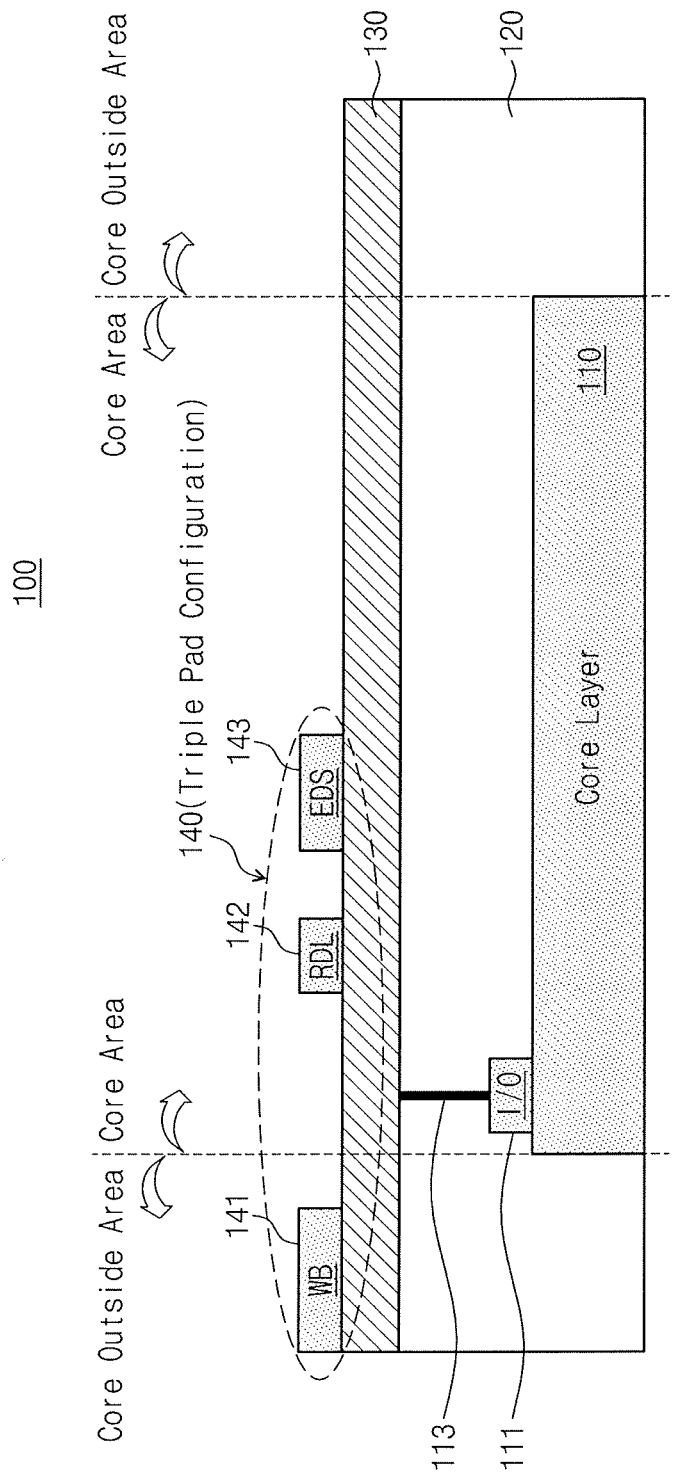
FIG. 2 is a cross-sectional view of a chip having a triple pad according to an exemplary embodiment of the inventive concept.

The RDL pad 142 may be electrically connected to a pad of a core layer using RDLs. In an exemplary embodiment of the inventive concept, the RDL pad 142 may exist in a core area. The core area may refer to an area that overlaps the core layer 110. For example, the core area may refer to an area that overlaps the core layer 110 and does not overlap areas beyond the boundaries of the core layer 110, as shown in FIG. 2. The areas that do not overlap the core layer 110 may be referred to as the core outside area.

In an exemplary embodiment of the inventive concept, the core area may include a crack stop structure and a die seal ring. The die seal ring may include a moisture oxidation barrier (MOB). The crack stop structure and the die seal ring are described in further detail in U.S. Pat. No. 8,048,761, the entire contents of which are hereby incorporated by reference.

The EDS pad 143 is a pad that may be used for a test operation. For example, in an exemplary embodiment of the inventive concept, the EDS pad 143 may be used for an electrostatic test (e.g., a wafer test) in a wafer level stage. In an exemplary embodiment of the inventive concept, the EDS pad 143 may be disposed in the core area.

In an exemplary embodiment of the inventive concept, the core area may include a guard ring. Here, the guard ring may be an area for cutting/assembling of the chip.

In an exemplary embodiment of the inventive concept, the EDS pad 143 may have a size sufficient to perform a cantilever probing test or a vertical probing test.

In an exemplary embodiment of the inventive concept, the EDS pad 143 may be electrically connected to the RDL pad 142 using RDLs.

In an exemplary embodiment of the present inventive concept, the chip 100 may have a reduced chip size as a result of the packaging utilizing the triple pad configuration.

FIG. 2 is a cross-sectional view of a chip having a triple pad according to an exemplary embodiment of the inventive concept.

Referring to FIG. 2, a triple pad 140 may include a bonding pad 141, an RDL pad 142, and an EDS pad 143, as described with reference to FIG. 1. The bonding pad 141, the RDL pad 142, and the EDS pad 143 may be connected to an input and output (I/O) pad 111 of a core layer 110 through the at least one RDL 130 and/or at least one via 113 between layers. As shown in FIG. 2, the via 113 may penetrate an insulating layer 120 and may be connected to the RDL 130 and the I/O pad 111. Although FIG. 2 shows the via 113 connecting the RDL 130 to an I/O pad 111, in exemplary embodiments, the via 113 may connect the RDL 130 to other types of pads disposed on the core layer 110.

Although FIG. 2 illustrates one RDL 130 and one via 113 for convenience of description, it is to be understood that according to exemplary embodiments of the inventive concept, the triple pad 140 and the I/O pad 111 may be electrically connected to each other through various paths configured with a plurality of RDLs 130 and/or a plurality of vias 113.

In an exemplary embodiment of the inventive concept, the triple pad 140 does not perform test probing during wire bonding. In an exemplary embodiment of the inventive concept, the triple pad 140 may perform test probing when wire bonding is not performed (e.g., when the triple pad 140 is used as a bump pad).

The triple pad 140 according to an exemplary embodiment of the inventive concept may include the bonding pad 141, which is disposed in the core outside area, and the RDL pad 142 and the EDS pad 143, which are disposed in a core area, as shown in FIG. 2.

The triple pad 140 shown in FIG. 2 may be disposed in an order of the bonding pad 141, the RDL pad 142, and the EDS pad 143 when viewed from the front side of the chip (e.g., the RDL pad 142 may be disposed between the bonding pad 141 and the EDS pad 143). For example, the RDL pad 142 may be disposed between the bonding pad 141 and the EDS pad 143. However, exemplary embodiments of the inventive concept are not limited thereto. That is, in exemplary embodiments, the locations of the RDL pad 142 and the EDS pad 143 in the triple pad 140 may be changed.

Figure 3:
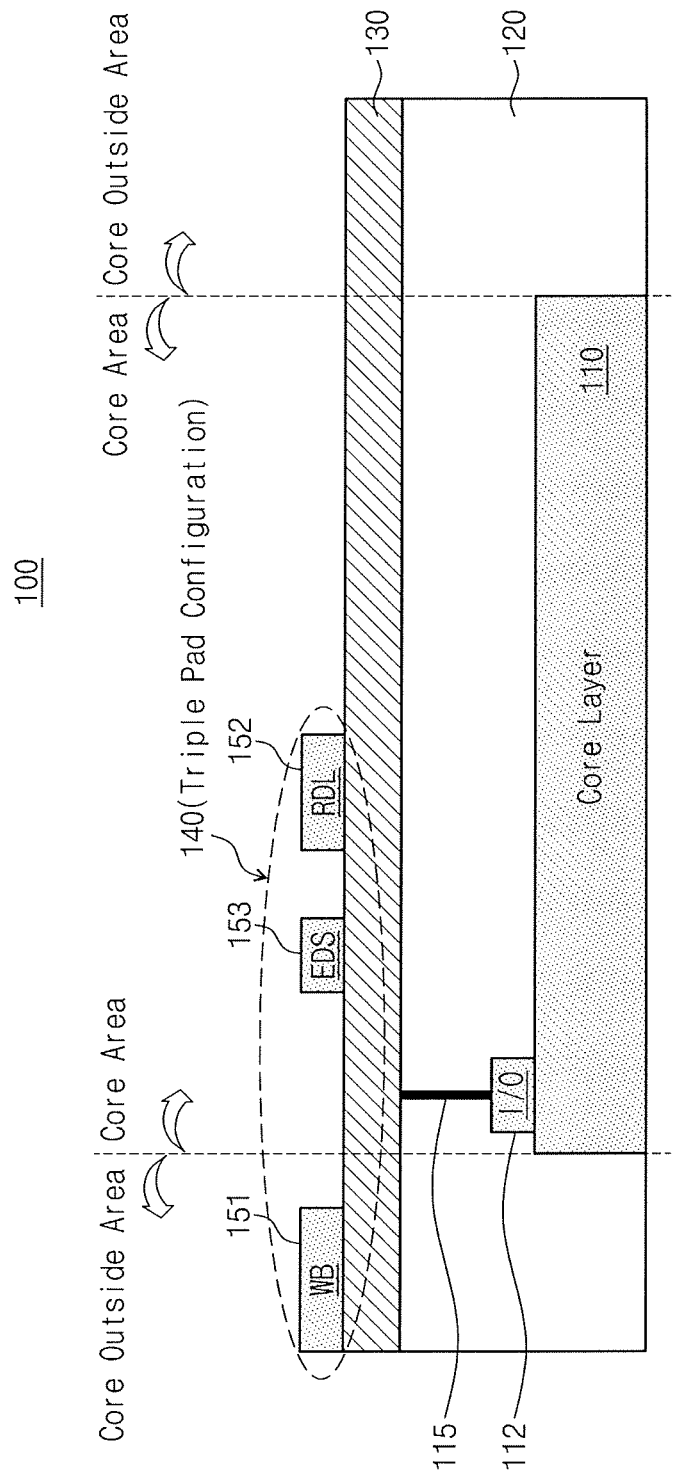
FIG. 3 is a cross-sectional view of a chip having a triple pad according to an exemplary embodiment of the inventive concept.

FIG. 3 is a cross-sectional view of a chip having a triple pad according to an exemplary embodiment of the inventive concept.

Referring to FIG. 3, a triple pad 140, as described with reference to FIG. 1, may include a bonding pad 151, an EDS pad 153, and an RDL pad 152, which are disposed in this order when viewed from the front side of the chip (e.g., the EDS pad 153 may be disposed between the bonding pad 151 and the RDL pad 152. That is, the EDS pad 153 may be disposed between the bonding pad 151 and the RDL pad 152. In an exemplary embodiment of the inventive concept, the triple pad 140 may be connected to an I/O pad 112 through at least one RDL 130 and/or at least one via 115.

As described above, the triple pad 140 shown in FIGS. 2 and 3 may include the bonding pad 141/151 disposed in the core outside area. However, exemplary embodiments of the inventive concept are not limited thereto. For example, the bonding pad according to exemplary embodiments of the inventive concept may be disposed in a core area.

Figure 4:
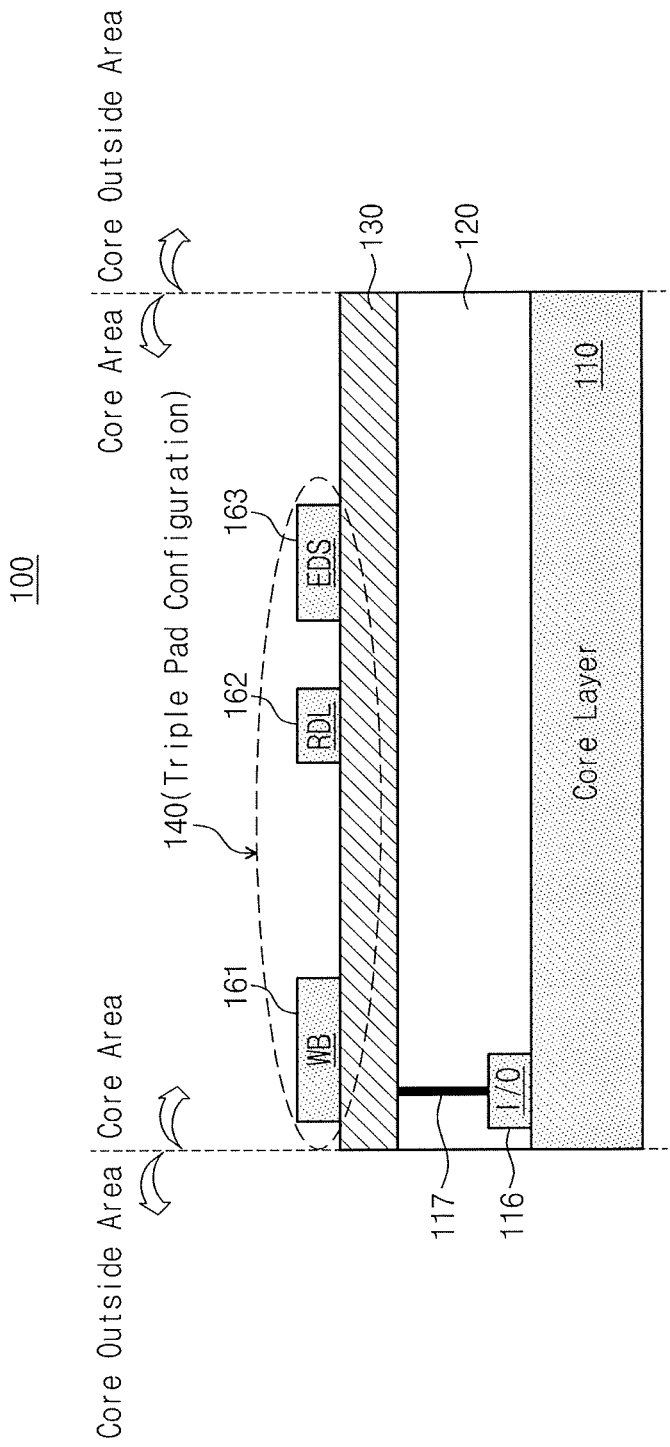
FIG. 4 is a cross-sectional view of a chip illustrating a triple pad according to an exemplary embodiment of the inventive concept.

FIG. 4 is a cross-sectional view of a chip having a triple pad according to an exemplary embodiment of the inventive concept.

Referring to FIG. 4, a triple pad 140, as described with reference to FIG. 1, may include a bonding pad 161, an RDL pad 162, and an EDS pad 163, which are disposed in a core area. The triple pad 140 may be connected to an I/O pad 116 through at least one RDL 130 and/or at least one via 117. In exemplary embodiments, a triple pad may be connected to the input/output pad 116 through at least one redistribution layer 130 and/or at least one via 117. The triple pad 140 illustrated in FIG. 4 may be used for packaging of a fan-in structure.

A chip having various triple pad configurations according to exemplary embodiments of the inventive concept are illustrated in FIGS. 2 to 4. However, it is to be understood that the pad configuration according to exemplary embodiments of the inventive concept is not limited to the configurations shown in FIGS. 2 to 4. For example, exemplary embodiments of the inventive concept may be applied to a dual pad configuration, as described in further detail below.

Figure 5:
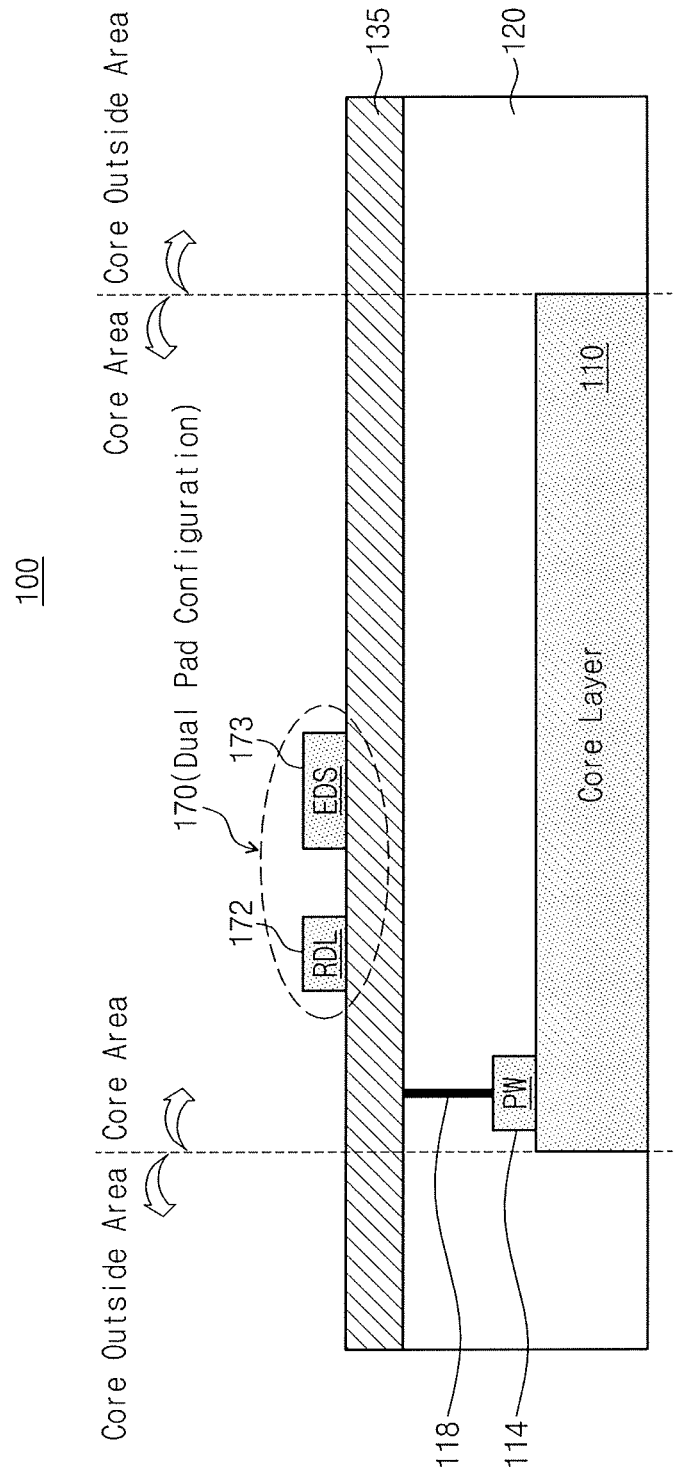
FIG. 5 is a cross-sectional view of a chip having a dual pad configuration according to an exemplary embodiment of the inventive concept.

FIG. 5 is a cross-sectional view of a chip having a dual pad configuration according to an exemplary embodiment of the inventive concept.

Referring to FIG. 5, a dual pad may include an RDL pad 172 and an EDS pad 173. As shown in FIG. 5, the RDL pad 172 may be connected to a power (PW) pad 114 of a core layer 110. The dual pad and the PW pad 114 may be electrically connected to each other through a plurality of RDLs 135 and/or vias 118.

In an exemplary embodiment of the inventive concept, the RDL pad 172 and the EDS pad 173 may be disposed in a core area, as shown in FIG. 5. However, exemplary embodiments of the inventive concept are not limited thereto.

Thus, the dual pad according to an exemplary embodiment of the inventive concept may include the RDL pad 172 and the EDS pad 173 disposed in the core area.

The dual pad shown in FIG. 5 may be connected to the PW pad 114. However, exemplary embodiments of the inventive concept are not limited thereto. For example, in exemplary embodiments, the dual pad may be connected to other types of pads including, for example, a ground pad or an I/O pad.

FIGS. 6A to 6H illustrate processes performed while fabricating a fan-out wafer level package according to an exemplary embodiment of the inventive concept.

Figure 6A:
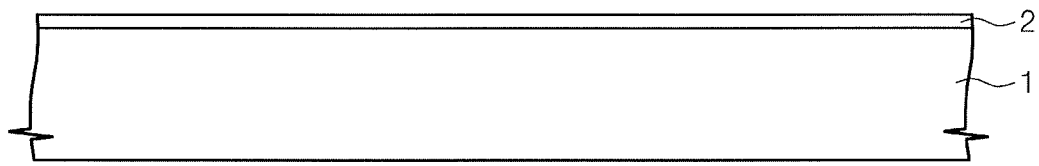
FIGS. 6A to 6H illustrate processes performed while fabricating a fan-out wafer level package according to an exemplary embodiment of the inventive concept.

Referring to FIG. 6A, an isolating film 2 may be formed on a dummy substrate 1. The dummy substrate 1 may include, for example, a glass substrate. The isolating film 2 may include, for example, a temporary adhesive. For example, the isolating film 2 may include a dual curable silicone modified adhesive. However, exemplary embodiments of the inventive concept are not limited thereto.

Figure 6B:
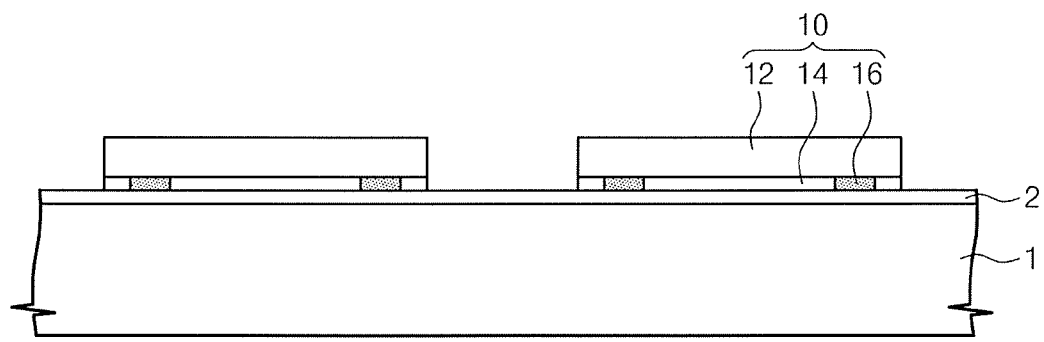

Referring to FIG. 6B, first semiconductor chips 10 are disposed on the isolating film 2. The isolating film 2 may attach the first semiconductor chips 10 to the dummy substrate 1. Each of the first semiconductor chips 10 may include a first device substrate 12, a first device passivation film 14, and a first device pad(s) 16. The first device substrate 12 may have a plurality of unit devices. The unit devices (e.g., core layers) may include, for example, memory devices, logic devices, or controller devices. Herein, the first device substrate 12 may be referred to as a core layer (e.g., the core layer 110) and vice versa. The first device passivation film 14 may be disposed on the first device substrate 12. The first device pads 16 may be connected to the first device substrate 12 through the first device passivation film 14. For example, the first device pads 16 may electrically connect the unit devices of the first device substrate 12 with each other. The first device passivation film 14 and the first device pads 16 may be disposed on the first device substrate 12. In an exemplary embodiment, the first semiconductor chips 10 shown in FIG. 6B may be disposed in an overturned state. The first device passivation film 14 and the first device pads 16 may adhere to the isolating film 2. In an exemplary embodiment of the present invention, each of the first device pads 16 may be an input and output (I/O) pad and/or a power pad.

Figure 6C:
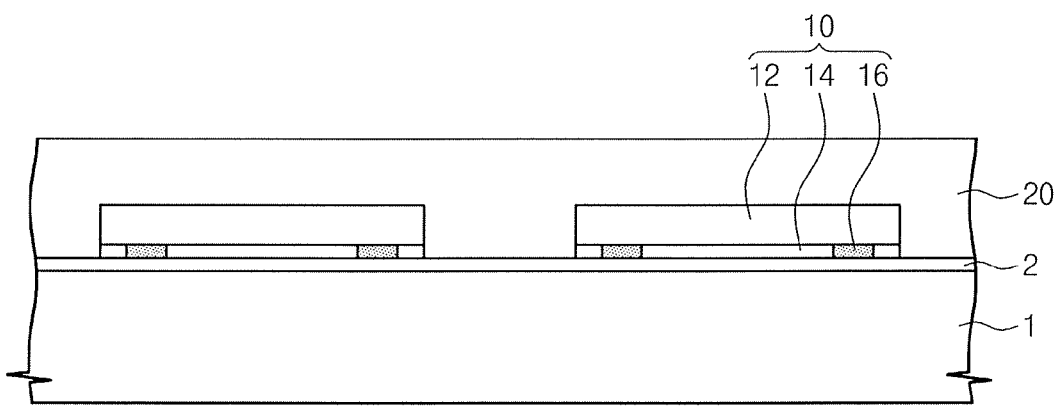

Referring to FIG. 6C, a mold substrate 20 may be formed on the first semiconductor chips 10 and the dummy substrate 1. The mold substrate 20 may include, for example, an epoxy molding compound. However, the mold substrate 20 is not limited thereto. The mold substrate 20 may be molded. For example, the mold substrate 20 may be formed by using a molding process to encapsulate the first semiconductor chips 10.

Figure 6D:
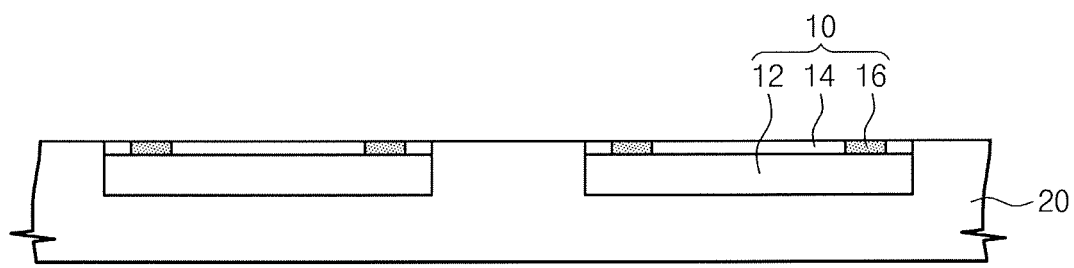

Referring to FIG. 6D, the first semiconductor chips 10 may be exposed by overturning a product in which the mold substrate 20 is formed, and removing the dummy substrate 1 and the isolating film 2. As a result of being heated, the isolating film 2 may be separated from the first semiconductor chips 10 and the mold substrate 20. The heated isolating film 2 may lose its adhesive properties. The first device substrate 12 may be disposed in the mold substrate 20. Upper surfaces of the first device passivation film 14 and the first device pads 16 may be substantially aligned with an upper surface of the mold substrate 20. For example, the upper surfaces of the first device passivation film 14, the first device pads 16, and the mold substrate 20 may be substantially coplanar.

Figure 6E:
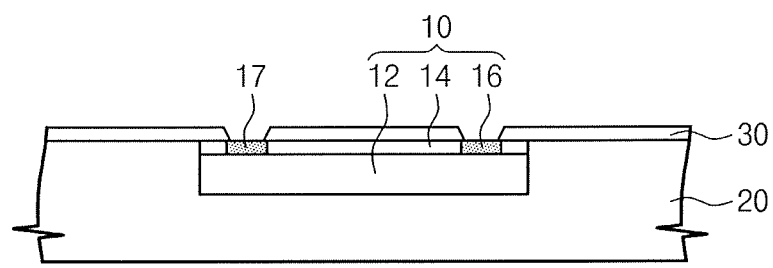

Referring to FIG. 6E, an insulating layer 30 may be formed on the exposed portions of the first semiconductor chips 10 and the mold substrate 20. The insulating layer 30 may include, for example, polymer or a dielectric layer. However, the insulating layer 30 is not limited thereto. The insulating layer 30 may be formed, for example, by a vapor deposition method or a sol-gel method. However, exemplary embodiments are not limited thereto. The insulating layer 30 may have contact holes. The first device pads 16 and a second device pad(s) 17 may be exposed through the contact holes.

Figure 6F:
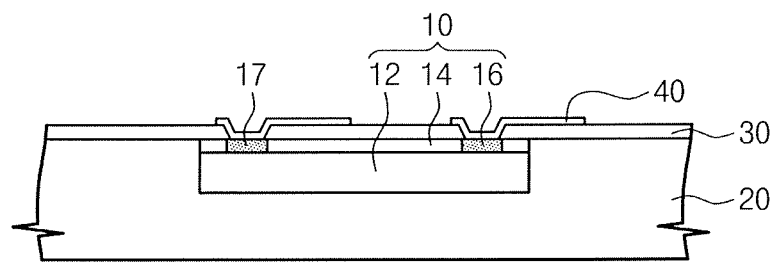

Referring to FIG. 6F, at least one redistribution layer (RDL) 40 may be formed on a part of the insulating layer 30, the first device pads 16, and the second device pads 17. The RDLs 40 may be formed, for example, by a seed film forming process, a mask patterning process, and an electroplating process. However, exemplary embodiments of the inventive concept are not limited thereto. A seed film may be formed, for example, by a sputtering method. However, exemplary embodiments are not limited thereto. The seed film may be formed, for example, on a first insulating layer, the first device pads 16, and the second device pads 17. The mask process refers to a process of forming a mask pattern on the seed film. A mask pattern film may expose the seed film in the shape of each of the RDLs 40. The electroplating process may refer to a process of forming the RDLs 40 on the exposed seed film. The RDLs 40 may be formed, for example, on a part of the insulating layer 30, the first device pads 16, and the second device pads 17. The RDLs 40 may be filled in contact holes. The RDLs 40 may connect the first device pads 16 to the second device pads 17. Thereafter, the mask pattern and an outer seed film of each of first RDLs 40 may be removed. In an exemplary embodiment of the inventive concept, at least one of the RDLs 40 may include a dual pad configuration or a triple pad configuration according to the exemplary embodiments shown in FIGS. 2 to 5.

Figure 6G:
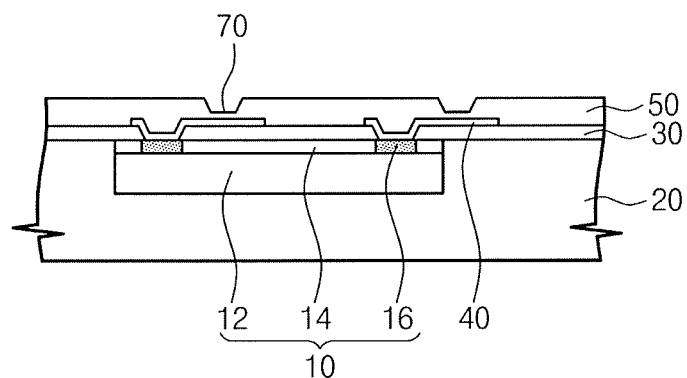

Referring to FIG. 6G, a solder mask film 50 may be formed on the insulating layer 30 and the RDLs 40. Contact holes 70 may be formed in a part of the solder mask film 50.

Figure 6H:
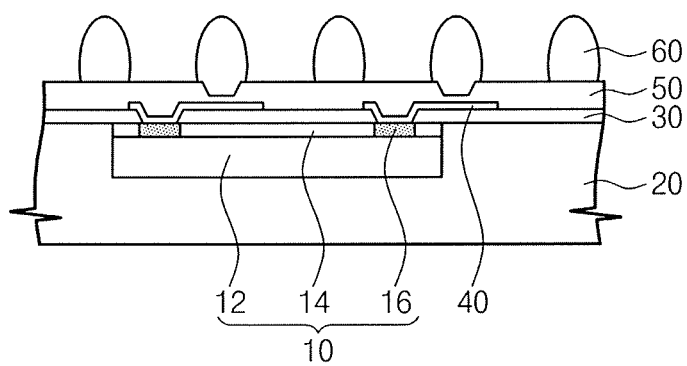

Referring to FIG. 6H, solder balls 60 may be formed in the contact holes 70 of the solder mask film 50. Thereafter, the wafer level packaging is completed by connecting another chip through wire bonding sharing the solder balls 60. In an exemplary embodiment of the inventive concept, the wafer level packaging may be completed with another chip using all or some of the solder balls 60 as bump pads.

Figure 7A:
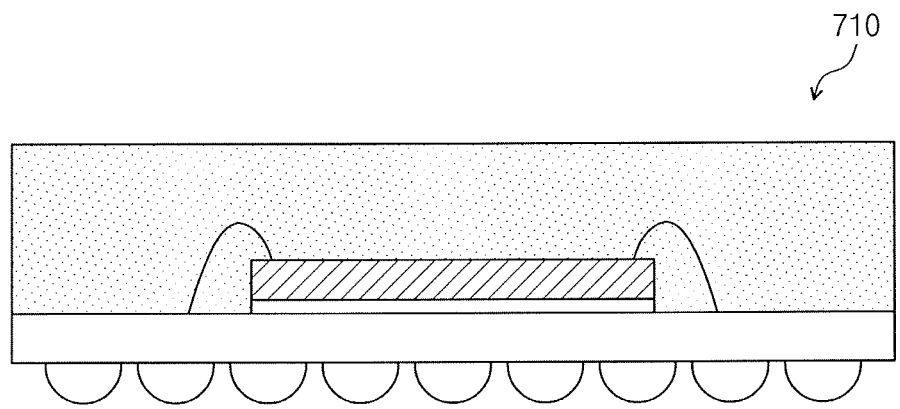
FIGS. 7A to 7D illustrate packaging using a triple/dual pad configuration according to an exemplary embodiment of the inventive concept.
Figure 7B:
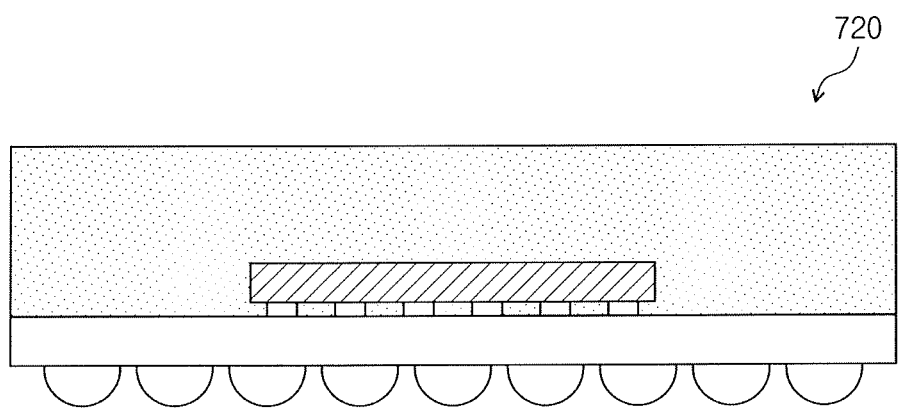

FIGS. 7A to 7D illustrate packaging using a triple/dual pad configuration according to an exemplary embodiment of the inventive concept. As shown in FIG. 7A, a package according to an exemplary embodiment of the inventive concept may be a wire bonding-fine pitch ball grid array (WB-FBGA) package 710. As shown in FIG. 7B, a package according to an exemplary embodiment of the inventive concept may be a flip chip-FBGA (FC-FBGA) package 720. Referring to FIGS. 7A and 7B, the WB-FBGA package 710 and the FC-FBGA package 720 may be packages in which EDS test probing may not be performed using a wire-bonded bonding pad and may be performed using an RDL pad inside the bonding pad.

Figure 7C:
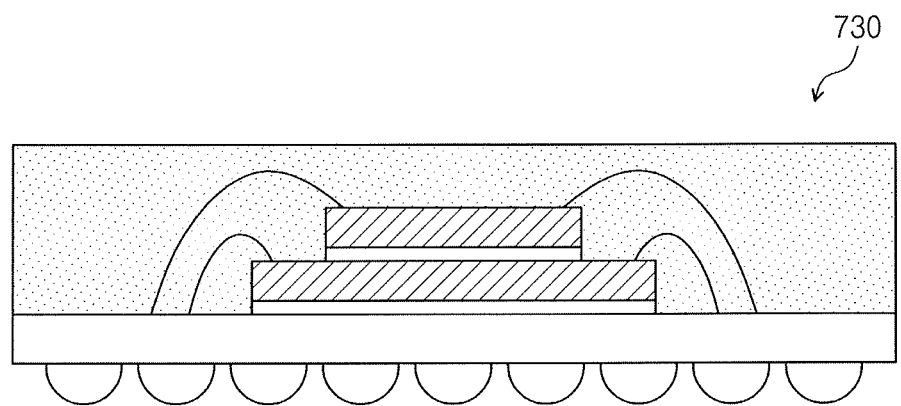
Figure 7D:
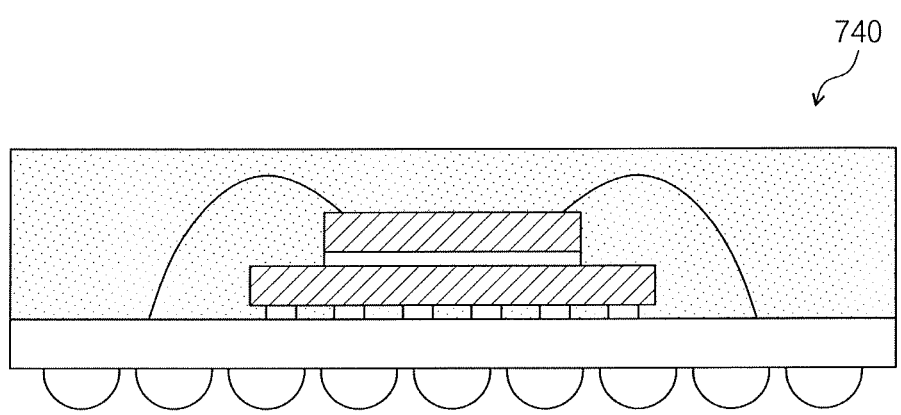

As shown in FIG. 7C, a package according to an exemplary embodiment of the inventive concept may be a WB/WB system in package (SIP) package 730. As shown in FIG. 7D, a package according to an exemplary embodiment of the inventive concept may be a WB/FC SIP package 740. Referring to FIGS. 7C and 7D, the WB/WB SIP package 730 and the WB/FC SIP package 740 may be packages in which EDS test probing may be performed in some of wire-bonded bonding pads and may not be performed in the others.

Figure 8A:
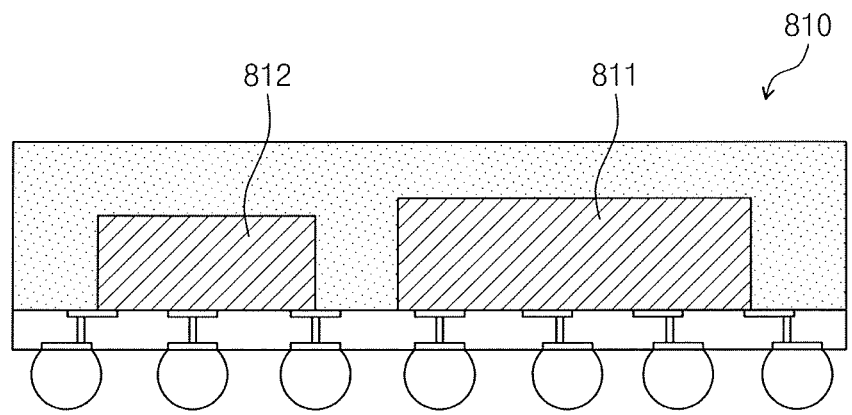
FIGS. 8A and 8B illustrate exemplary fan-out wafer level package (FOWLP) system in package (SIP) packages using a pad configuration according to an exemplary embodiment of the inventive concept.
Figure 8B:
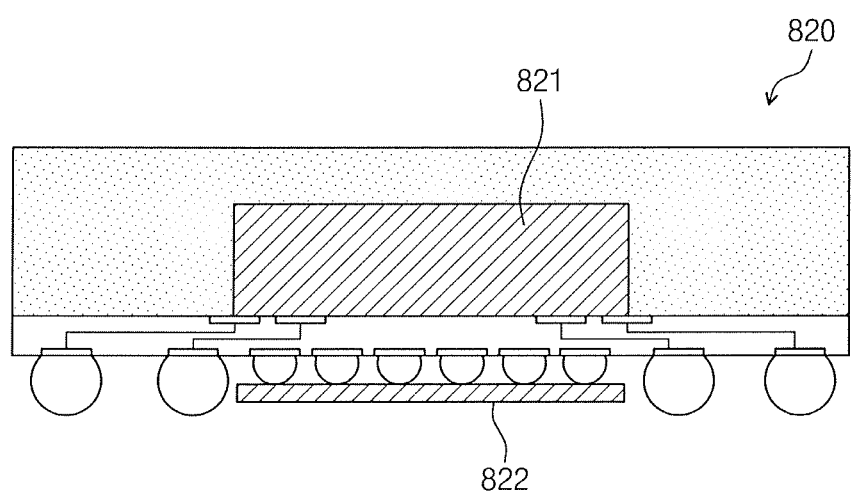

FIGS. 8A and 8B illustrate exemplary fan-out wafer level package (FOWLP) SIP packages using a pad configuration according to an exemplary embodiment of the inventive concept.

As shown in FIG. 8A, a package according to an exemplary embodiment of the inventive concept may be an SBC SIP FOWLP 810. As shown in FIG. 8B, a package according to an exemplary embodiment of the inventive concept may be an F2F SIP FOWLP 820. The SBS SIP FOWLP package 810 of FIG. 8A may include chips 811 and 812 of a fan-out structure. Here, each of the chips 811 and 812 may be implemented with a chip 100 illustrated in FIG. 1. In each of the chips 811 and 812, a portion of bonding pads for wire bonding may include a pad used to perform EDS test probing and a pad not used to perform EDS test probing. Likewise, the F2F SIP FOWLP package 820 of FIG. 8B may include chips 821 and 822 each having the above-described triple pad/dual pad. The chip 821 may have a fan-out structure, and the chip 822 may have a fan-in structure.

Figure 9A:
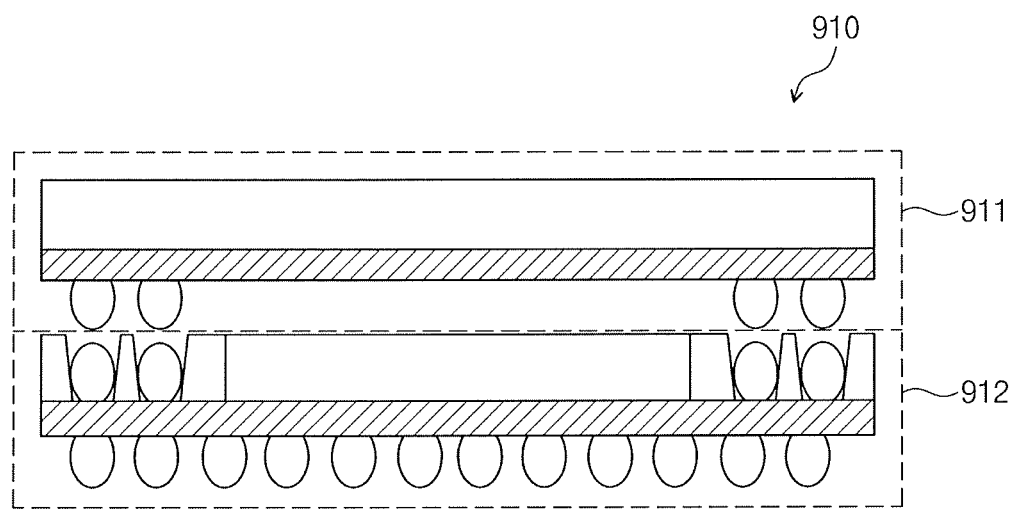
FIGS. 9A and 9B illustrate exemplary FOWLP package on packages (POPs) using a pad configuration according to an exemplary embodiment of the inventive concept.
Figure 9B:
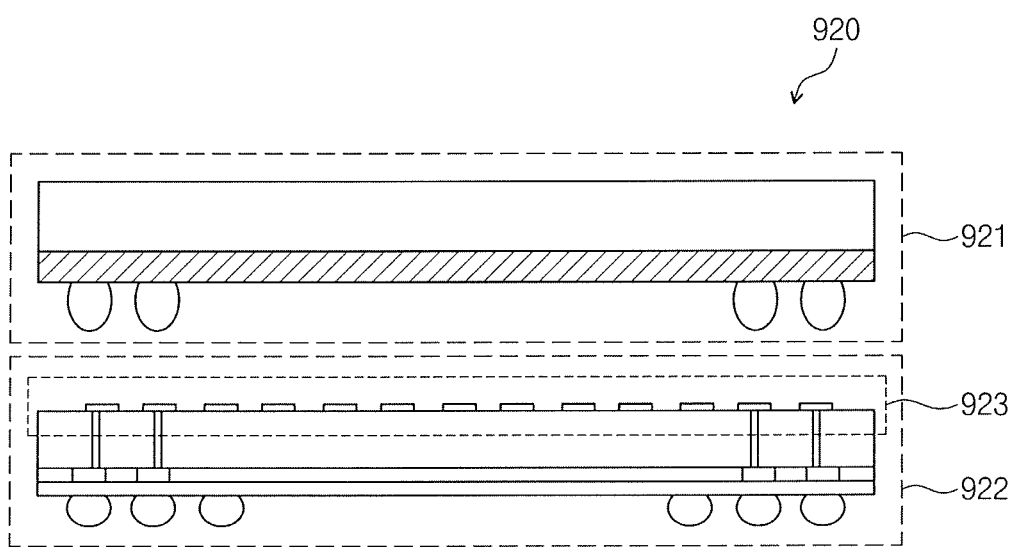

FIGS. 9A and 9B illustrate exemplary FOWLP package on packages (POPs) using a pad configuration according to an exemplary embodiment of the inventive concept.

As shown in FIG. 9A, a package according to an exemplary embodiment of the inventive concept may be an FOWLP LDP-POP 910. As shown in FIG. 9B, a package according to an exemplary embodiment of the inventive concept may be an FOWLP interposer POP 920.

The FOWLP LDP-POP package 910 of FIG. 9A may include an upper package 911 and a lower package 912. Here, at least one of the upper package 911 and the lower package 912 may be implemented to connect at least one pad of a core layer and at least one solder ball using the above-described triple pad/dual pad.

The FOWLP Interposer POP package 920 of FIG. 9B may include an upper package 921 and a lower package 922. Here, at least one of the upper package 921 and the lower package 922 may be implemented to connect at least one pad of a core layer and at least one solder ball using the above-described triple pad/dual pad. The lower package 922 may further include an interposer 922 for easy connection with the upper package 911.

Figure 10:
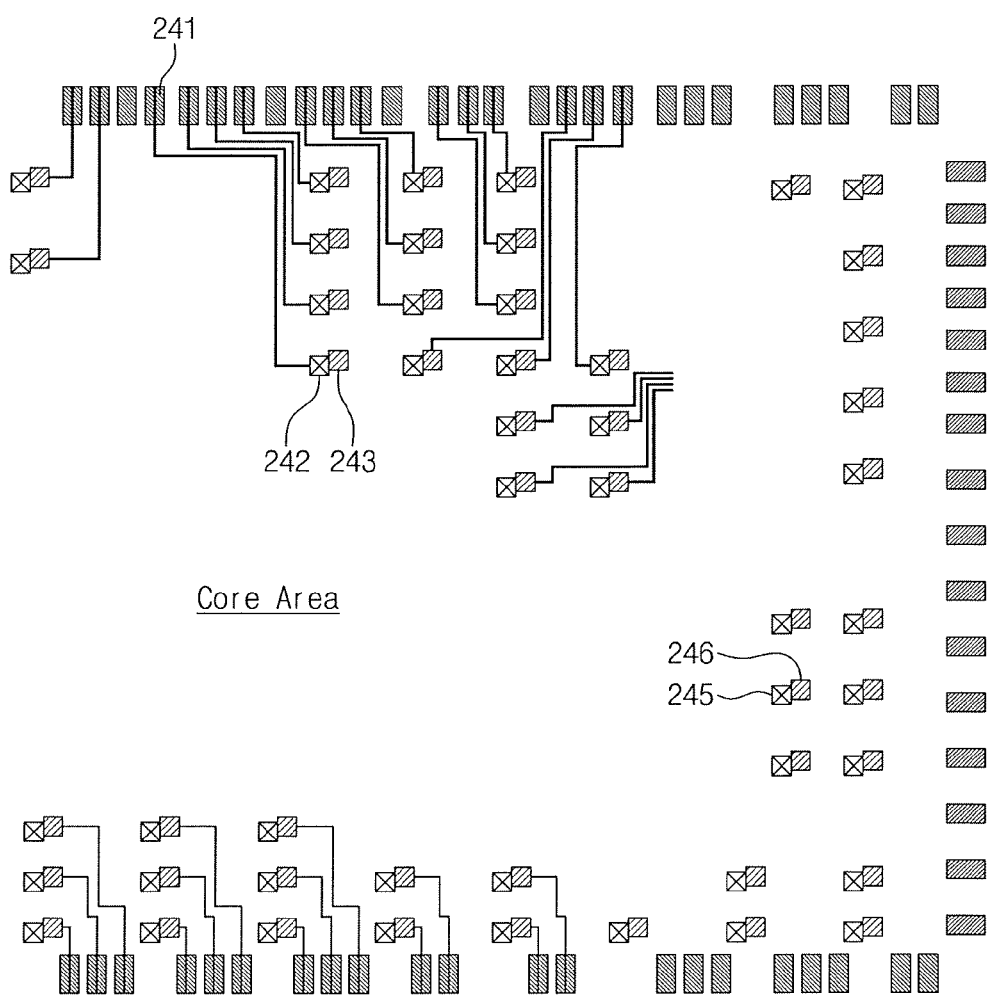
FIG. 10 is a plan view of a chip illustrating an exemplary pad design according to an exemplary embodiment of the inventive concept.

FIG. 10 is a plan view of a chip illustrating an exemplary pad design according to an exemplary embodiment of the inventive concept.

Referring to FIG. 10, a first pad may be designed such that a bonding pad 241 is disposed outside of a core area, and an RDL pad 242 and an EDS pad 243, which are connected to the bonding pad 241, are disposed in the core area. In an exemplary embodiment of the inventive concept, the first pad may be an input and output (I/O) pad. Further, a second pad may be designed such that an RDL pad 245 and an EDS pad 246 are disposed in the core area. In an exemplary embodiment of the inventive concept, the second pad may be a power pad.

Figure 11:
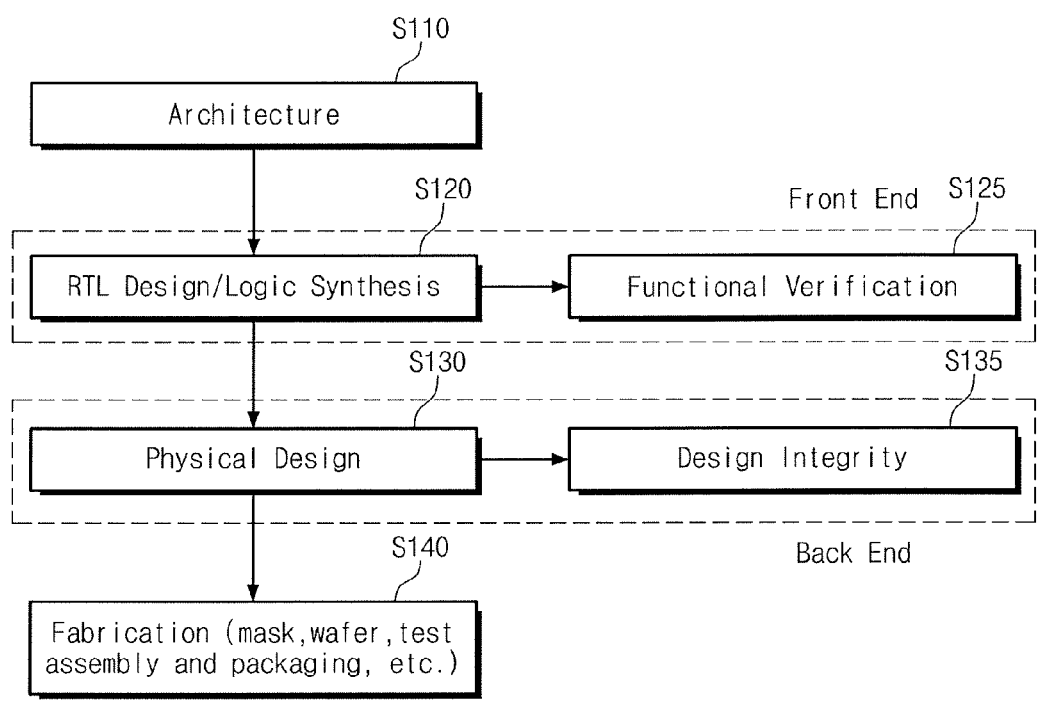
FIG. 11 is a flowchart illustrating an exemplary process of fabricating a non-memory chip according to an exemplary embodiment of the inventive concept.

FIG. 11 is a flowchart illustrating an exemplary process of fabricating a non-memory chip according to an exemplary embodiment of the inventive concept.

Referring to FIGS. 1 to 11, a method of fabricating a non-memory chip may proceed as follows:

In operation S110, an integrated circuit for the non-memory chip may be designed. In operation S120, a register transfer level (RTL) design/logic synthesis may be performed. An RTL may be used for indicating a coding style used in hardware description languages which effectively secure that code models may be synthesized in a certain hardware platform such as, for example, a field programmable gate array (FPGA) or an application specific integrated circuit (ASIC) (e.g., code models may be converted into real logic functions). A plurality of hardware description languages may be used for generating RTL modules. The plurality of hardware description languages may include, for example, System Verilog, Verilog, Verilog Hardware Description Language (VHDL), etc. Thereafter, in operation S125, functional verification for the synthesized logic may be performed.

Once the function verification is completed, a physical design (e.g., a layout) may be generated in operation S130. Herein, the layout may be a process of making data necessary for fabricating a mask for implementing an integrated circuit on a wafer. Further, the layout may refer to a series of operations for placing and routing semiconductor devices (e.g., transistors, resistors, and capacitors) having electrical characteristics along a designed circuit that is suitable for a layout design rule required by a semiconductor process. A layout method may be classified into a full custom type for manually performing an operation according to an operation type using a layout editor, an auto place & routing (P & R) type using an auto place/routing tool, and a semi-custom type using all of the aforementioned types. In an exemplary embodiment of the inventive concept, input and output (I/O) pads in a layout design may be implemented by the triple pad configuration describe above.

After designing the layout, design integrity may be verified in operation S135. Verification processes may include, for example, a design rule check (DRC) that checks whether a layout is correctly designed to be suitable for a design rule, an electrical rule check (ERC) that checks whether the layout is correctly designed internally without being electrically disconnected, a layout vs schematic (LVS) check that verifies whether a layout is identical to a gate level netlist, etc.

Thereafter, in operation S140, the non-memory chip may be fabricated by a mask, a wafer, a test, an assembly, packaging, etc.

Figure 12:
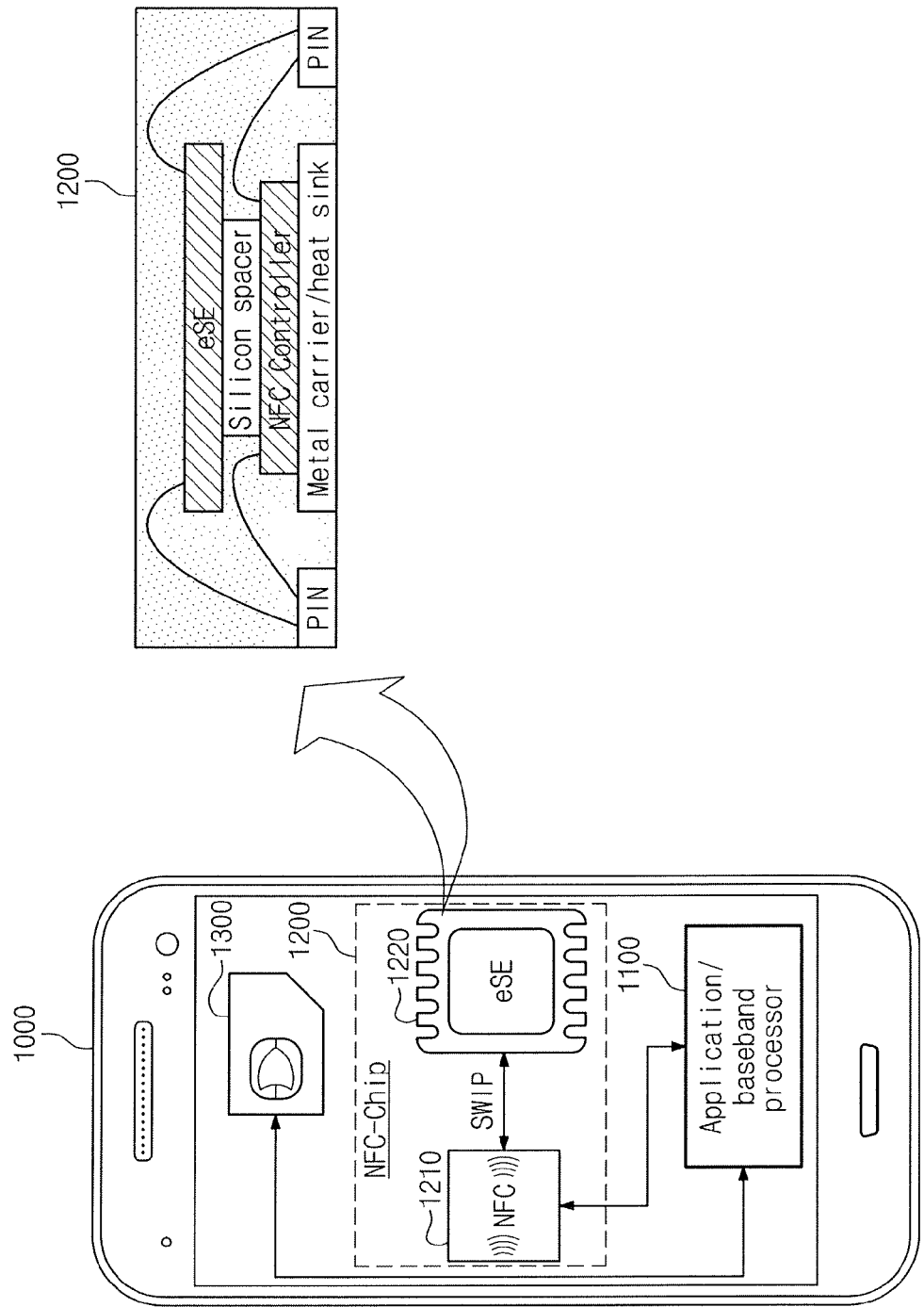
FIG. 12 illustrates an exemplary mobile device implemented using a triple/dual pad according to an exemplary embodiment of the inventive concept.

FIG. 12 illustrates an exemplary mobile device implemented using a triple/dual pad according to an exemplary embodiment of the inventive concept.

Referring to FIG. 12, the mobile device 1000 may include, for example, a package chip including an integrated processor 1100, a near field communication (NFC) chip 1200, and a memory 1300 for storing/controlling programs and/or for storing user data.

The integrated processor 1100 may be implemented to control applications executed in the mobile device 1000 and/or to control wired and wireless communication with an external device.

The NFC chip 1200 may be implemented to perform an NFC service in the mobile device 1000. The NFC chip 1200 may include, for example, an NFC controller 1210 and an embedded secure element (eSE) 1220 for storing security authentication information (e.g., credit card information, membership information, identification (ID) information, etc.), allowing the mobile device 1000 to perform an NFC function using the authentication information. For example, the authentication information may be exchanged between the mobile device 1000 and another device via an NFC communication service provided by the NFC chip 1200 (e.g., the authentication information may be transmitted from the mobile device 1000 to another device via an NFC communication service to authenticate the mobile device 1000). In an exemplary embodiment of the inventive concept, single wire protocol (SWP) communication may be performed between the NFC controller 1210 and the eSE 1220. An interposer may be disposed between the NFC controller 1210 and the eSE 1220.

In an exemplary embodiment of the inventive concept, as shown in FIG. 12, the NFC controller 1210 and the eSE 1220 may be configured by FOWLP imposer SIP packaging. A test and packaging may be performed using the triple pad/dual pad configuration according to exemplary embodiments described above. However, it is to be understood that the NFC chip 1200 according to an exemplary embodiment of the inventive concept is not limited to the FOWLP imposer SIP packaging.

The NFC chip 1200 may perform internal communication with the memory 1300 to perform user authentication for performing an NFC service. The memory 1300 may be, for example, a subscriber identification module (SIM) card.

The NFC chip 1200 according to an exemplary embodiment of the inventive concept may package the NFC controller 1210 and the eSE 1220.

The triple pad/dual pad according to exemplary embodiments of the inventive concept may be used for wafer level packaging of various types. Here, wafer level packaging may be fan-in/fan-out packaging using the above-described triple pad/dual pad. For example, the triple pad/dual pad may be used for packaging an application (AP) and a power management integrated circuit (PMIC).

The chip according to exemplary embodiments of the inventive concept may be mounted using packages of various types. For example, in exemplary embodiments of the inventive concept, the chip may be mounted using packages such as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated circuit (SOIC), a shrink small outline package (SSOP), a thin small outline package (TSOP), a thin quad flat pack (TQFP), a system in package (SIP), a multi chip package (MCP), a wafer-level fabricated package (WFP), and a wafer-level processed stack package (WSP). However, exemplary embodiments of the inventive concept are not limited thereto.

As described above, the chip and the packaging method thereof according to exemplary embodiments of the inventive concept may reduce a chip size by having the triple pad having the EDS pad disposed in the core area.

While the present inventive concept has been particularly shown and described with reference to the exemplary embodiments thereof, it will be understood by those skilled in the art that various changes in form and detail may be made therein without departing from the spirit and scope of the inventive concept as defined by the following claims.

What is claimed is:
1. A chip, comprising:
a core layer;
at least one redistribution layer formed on the core layer; and
at least one triple pad connected to a pad of the core layer through the at least one redistribution layer or at least one via connected to the at least one redistribution layer,
wherein the at least one triple pad comprises a bonding pad, a redistribution layer pad connected to the at least one redistribution layer, and a test pad configured to perform a wafer level test,
wherein the bonding pad, the redistribution layer pad and the test pad are electrically connected to one another through the at least one redistribution layer, and are physically spaced apart from one another on the at least one redistribution layer in a cross-sectional view,
wherein the test pad is disposed in a core area that overlaps the core layer,
wherein the at least one redistribution layer is disposed between the at least one triple pad and the core layer, each of the bonding pad, the redistribution layer pad and the test pad is disposed on the at least one redistribution layer, and each of the bonding pad, the redistribution layer pad and the test pad protrudes from the at least one redistribution layer.

2. The chip of claim 1, wherein the bonding pad is disposed in the core area.

3. The chip of claim 2, wherein the test pad is configured to perform a probing test.

4. The chip of claim 2, wherein the bonding pad is a bump pad.

5. The chip of claim 1, wherein the bonding pad is disposed in a core outside area that does not overlap the core layer.

6. The chip of claim 5, wherein the redistribution layer pad is disposed in the core area that overlaps the core layer, and an internal circuit is disposed in the core layer.

7. The chip of claim 6, wherein the internal circuit comprises a memory device.

8. The chip of claim 6, wherein the internal circuit comprises a logic device.

9. The chip of claim 6, wherein the internal circuit comprises a controller device.

10. The chip of claim 5, wherein the bonding pad is configured to perform wire bonding.

11. The chip of claim 1, wherein the redistribution layer pad is disposed between the bonding pad and the test pad.

12. The chip of claim 1, wherein the test pad is disposed between the bonding pad and the redistribution layer pad.

13. The chip of claim 1, wherein the pad of the core layer is an input and output pad.

14. A method of packaging a wafer level chip, comprising:
disposing a core layer on a substrate;
forming a mold substrate on the core layer;
removing the substrate;
forming an insulating layer on the core layer and the mold substrate;
forming at least one contact hole in the insulating layer that exposes at least one pad of the core layer; and
forming at least one redistribution layer connected to the at least one pad,
wherein forming the at least one redistribution layer comprises forming at least one triple pad,
wherein the at least one triple pad comprises a bonding pad, a redistribution layer pad, and a test pad electrically connected to one another through the at least one redistribution layer,
wherein the bonding pad, the redistribution layer pad, and the test pad are physically spaced apart from one another on the at least one redistribution layer in a cross-sectional view,
wherein the test pad is disposed in a core area that overlaps the core layer,
wherein the at least one redistribution layer is disposed between the at least one triple pad and the core layer, each of the bonding pad, the redistribution layer pad and the test pad is disposed on the at least one redistribution layer, and each of the bonding pad, the redistribution layer pad and the test pad protrudes from the at least one redistribution layer.

15. The method of claim 14, further comprising:
performing a wafer level test using the test pad.

16. The method of claim 15, further comprising:
forming a mask film having at least one contact hole.

17. The method of claim 16, further comprising:
forming at least one solder ball in the at least one contact hole of the mask film.

18. The method of claim 14, wherein the bonding pad is disposed in the core area.

19. The method of claim 14, wherein the bonding pad is disposed outside of the core area.

20. The method of claim 14, further comprising:
performing a wire bonding process using the bonding pad.

21. A package chip, comprising:
a near field communication (NFC) controller configured to provide an NFC service; and
an embedded secure element disposed on the NFC controller and configured to store authentication information,
wherein the NFC controller and the embedded secure element are packaged using at least one triple pad,
wherein the at least one triple pad comprises a bonding pad, a redistribution layer pad, and a test pad configured to perform a wafer level test connected to at least one redistribution layer,
wherein the bonding pad, the redistribution layer pad and the test pad are electrically connected to one another through the at least one redistribution layer, and are physically spaced apart from one another on the at least one redistribution layer in a cross-sectional view,
wherein the test pad is disposed in a core area that overlaps a core layer,
wherein the at least one redistribution layer is disposed between the at least one triple pad and the core layer, each of the bonding pad, the redistribution layer pad and the test pad is disposed on the at least one redistribution layer, and each of the bonding pad, the redistribution layer pad and the test pad protrudes from the at least one redistribution layer.

22. The package chip of claim 21, further comprising:
an interposer disposed between the NFC controller and the embedded secure element.

23. The package chip of claim 21, wherein the at least one triple pad is connected to an input and output pad of the core layer.

24. The package chip of claim 21, wherein the at least one triple pad is connected to a power pad or a ground pad of the core layer.

25. The package chip of claim 21, wherein the package chip is packaged using one of a wafer level package (WLP), a fan-out wafer level package (FOWLP), a wire bonding-fine pitch ball grid array (WB-FBGA) package, a flip chip-FBGA (FC-FBGA) package, a WB/WB package, a WB/FC-FBGA package, a WB/WB system in package (SIP) package, a WB/FC SIP package, a fan-out wafer level package (FOWLP) SIP package, and a FOWLP package on package (POP).

* * * * *